US006496510B1

(12) United States Patent
Tsukakoshi et al.

(10) Patent No.: US 6,496,510 B1
(45) Date of Patent: Dec. 17, 2002

(54) SCALABLE CLUSTER-TYPE ROUTER DEVICE AND CONFIGURING METHOD THEREOF

(75) Inventors: Masato Tsukakoshi, Sagamihara; Shigeki Morimoto, Atsugi, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/190,437

(22) Filed: Nov. 13, 1998

(30) Foreign Application Priority Data

Nov. 14, 1997 (JP) .............................................. 9-313553

(51) Int. Cl.[7] .......................... H04L 12/28; H04L 12/44
(52) U.S. Cl. ...................... 370/401; 370/351; 370/400; 709/238; 709/242; 709/243
(58) Field of Search ................................ 370/238, 254, 370/351, 389, 400, 912, 401; 709/201, 223, 224, 238, 239, 241, 242, 243

(56) References Cited

U.S. PATENT DOCUMENTS

| 5,018,133 | A | * | 5/1991 | Tsukakoshi et al. | .......... 370/16 |
| 5,473,599 | A | * | 12/1995 | Li et al. | .......... 370/16 |
| 5,892,912 | A | * | 4/1999 | Suzuki et al. | .......... 395/200.48 |
| 6,047,330 | A | * | 4/2000 | Stracke, Jr. | .......... 709/238 |
| 6,049,524 | A | * | 4/2000 | Fukushima et al. | .......... 370/220 |
| 6,085,238 | A | * | 7/2000 | Yuasa et al. | .......... 709/223 |
| 6,192,051 | B1 | * | 2/2001 | Lipman et al. | .......... 370/389 |

OTHER PUBLICATIONS

J. Ge and H. Qian. Cluster–Based Virtual Router. 2002 IEEE. pp. 102–109.*
J. Cao and F. Zhang. Optimal Configuration in Hierarchical Network Routing. 1999 IEEE. pp. 249–254.*
"New Cisco 7500 Delivers More Routing Muscle", Packet Magazine Archives, Third Quarter 1995, Cisco Systems Inc.
"Configuring High System Availability Operation" Route Switch Processor (RSP2) Installation and Configuratioin Cisco Connection Documentation, Enterprise Series vol. 3, No. 5@1996.

* cited by examiner

Primary Examiner—Hassan Kizou
Assistant Examiner—Joe Logsdon
(74) Attorney, Agent, or Firm—Antonelli, Terry, Stout & Kraus, LLP

(57) ABSTRACT

A router device is provided with a plurality of router node devices interconnected via internal transmission lines, in which each of the plurality of router node devices comprises a unit for connecting to a plurality of networks; a routing table describing paths via which packets are forwarded; a forwarding unit for forwarding a packet between one network and another, and for forwarding the packet between the network connected to the router node device and the network connected to some other router node device of the router device via some other router node device, according to the routing table; a routing information collection unit for collecting routing information from each router device connected to the network, not via other router node devices, to the router node device to create a routing table in each router device, the routing information being information to be exchanged among router devices, a distribution unit for distributing the collected routing information to other router node devices via the internal transmission lines; and a routing table generation unit for generating the routing table based on the collected routing information and the routing information distributed from the other router node devices.

20 Claims, 8 Drawing Sheets

| ROUTER ID | NETWORK | INTERFACE ADDRESS | COST |
|---|---|---|---|
| 192.168.1.1 | netA | 192.168.1.1 | 1 |
| | netB | 192.168.10.3 | 3 |
| | netC | 192.168.12.10 | 3 |
| 192.168.10.5 | netB | 192.168.10.5 | 1 |
| | netD | 192.168.11.12 | 2 |
| 192.168.12.3 | netC | 192.168.12.3 | 5 |
| | netE | 192.168.15.1 | 2 |
| 192.168.1.5 | netA | 192.168.1.5 | 1 |
| | netD | 192.168.11.1 | 1 |
| | netE | 192.168.15.2 | 1 |

| NETWORK | NEXT HOP ROUTER ADDRESS | COST |
|---|---|---|
| netA | — | 1 |
| netB | 192.168.11.12 | 2 |
| netC | 192.168.1.1 | 4 |
| netD | — | 1 |
| netE | — | 1 |

SCALABLE CLUSTER-TYPE ROUTER DEVICE AND CONFIGURING METHOD THEREOF

BACKGROUND OF THE INVENTION

1. Field of the Invention

This invention relates to technology for routing packets over a network, and more particularly to technology for a router device, composed of a plurality of interconnected router node devices and externally behaving as a single router, to send and receive routing information to or from other routers.

2. Description of Related Art

A router which transfers packets from a terminal on a network to a terminal on another network exchanges routing information with another router to perform dynamic routing and, based on this routing information, generates a table, called a routing table, which contains a set of entries that each specify a packet destination address and the next-hop used to reach that destination.

Two protocols are known for exchanging routing information and for generating a routing table based on the information: one is a Distance Vector Algorithm (DVA) based protocol, such as Routing Information Protocol (RIP) stipulated by Request for Comments (RFC) 1058 prepared by the Internet Engineering Task Force (IETF) and issued from the Internet Architecture Board (IAB), and the other is a Link-State Algorithm (LSA) based protocol such as Open Shortest Path First (OSPF) stipulated by RFC 1247.

A RIP-based router exchanges routing table entries with another router and determines a routing path according to the number of hops (the number of routers to the destination), while an OSPF-based router exchanges network connection state information (addresses and so on) and determines a path based on a cost determined by considering many factors including the number of hops. It should be noted that, in exchanging routing information among routers, a particular packet called a routing protocol packet is used.

To increase performance, a router has been proposed which has its function divided into two (using two processors): a packet forwarding function and a routing table generation function. This configuration prevents the packet forwarding function from being affected by the load on the routing table generation function. This technology is described in "Packet Magazine Third Quarter 1995" published by Cisco.

SUMMARY OF THE INVENTION

The present inventors have been studying so as to accomplish a router device capable of processing at higher speed using a router configured of two portions, one is a part for forwarding packets and the other is a part for executing a protocol for generating a routing table as described above. As an example, they have proposed that a plurality of routers configured as described above are used as router nodes interconnected via a plurality of high-speed transmission lines to have a single router. Such a configuration have been described in the Japanese Patent Application (Hei 10-185921).

As a method for generating routing tables on such a router composed of a plurality of router nodes using the table generation method designed for use on a conventional router not composed of a plurality of router nodes, the present inventors have proposed that one of the following two methods is used.

In the first method, each router node acts as if it was a conventional router not composed of a plurality of nodes. In this case, each router node exchanges routing protocol packets with other routers and other router nodes connected to that router node to create its own routing table.

In the second method, one of the plurality of router node units stores therein the routing information on all other router nodes and only this router node exchanges routing protocol packets with all other routers connected to the router device composed of the plurality of router nodes. Collected routing information is then distributed to all other router nodes.

However, in the first method, one router node must be equivalent to one router when sending or receiving routing protocol packets and generating the routing table. Therefore, a router composed of a plurality of router nodes must be equivalent, at least, to one network or one sub-net composed of a plurality of routers. This means that a host address must be assigned to each router node and that one network address or sub-net address must be assigned to the router composed of the plurality of router nodes. Thus, this method results in inefficient address usage.

In the second method, the router node which processes routing protocol packets for the plurality of nodes is too busy to generate or update routing table entries within an allowable time, sometimes discarding packets or causing a traffic problem.

It is an object of the present invention to provide a router device composed of a plurality of router nodes to perform routing protocol processing without using extra addresses and without exerting a heavy load on a particular router node.

To achieve the above object, the present invention provides, for example, a method for use in a router device which connects to a plurality of networks and in which a plurality of router node devices, each forwarding packets according to a routing table describing paths via which the packets are forwarded, are interconnected by internal transmission lines. The method, provided for processing a routing protocol for generating the routing table, wherein a process in said routing protocol processing, for collecting routing information requested for generating the routing table from the other router device, comprises the steps of causing each of the router node devices to collect routing information from router devices connected to the network connected, not via other router nodes, to the router node device; and collecting and integrating the routing information collected by each router node device via the internal transmission lines.

In this processing method, because each router node performs a part of the processing performed by one router device, a router device composed of a plurality of router nodes may be treated as a single router device from the viewpoint of address usage. Thus, there is no need to assign network addresses or sub-net addresses to a router device composed of a plurality of router nodes. In addition, the plurality of router nodes collect routing information from other router devices connected to the router device, preventing the processing load from being concentrated on a particular router node.

BRIEF DESCRIPTION OF THE DRAWINGS

FIG. 4 is a diagram showing an example of a link state database in a router node used according to the embodiment of the present invention.

FIG. 5 is a diagram showing an example of a routing table in the router node according to the embodiment of the present invention.

DETAILED DESCRIPTION OF PREFERRED EMBODIMENTS

An embodiment according to the present invention will be described with reference to the attached drawings.

In the following description, a router composed of a plurality of router nodes is called a cluster-type router to distinguish it from other routers. In the present invention, OSPF is used as the routing protocol.

Figure 1:
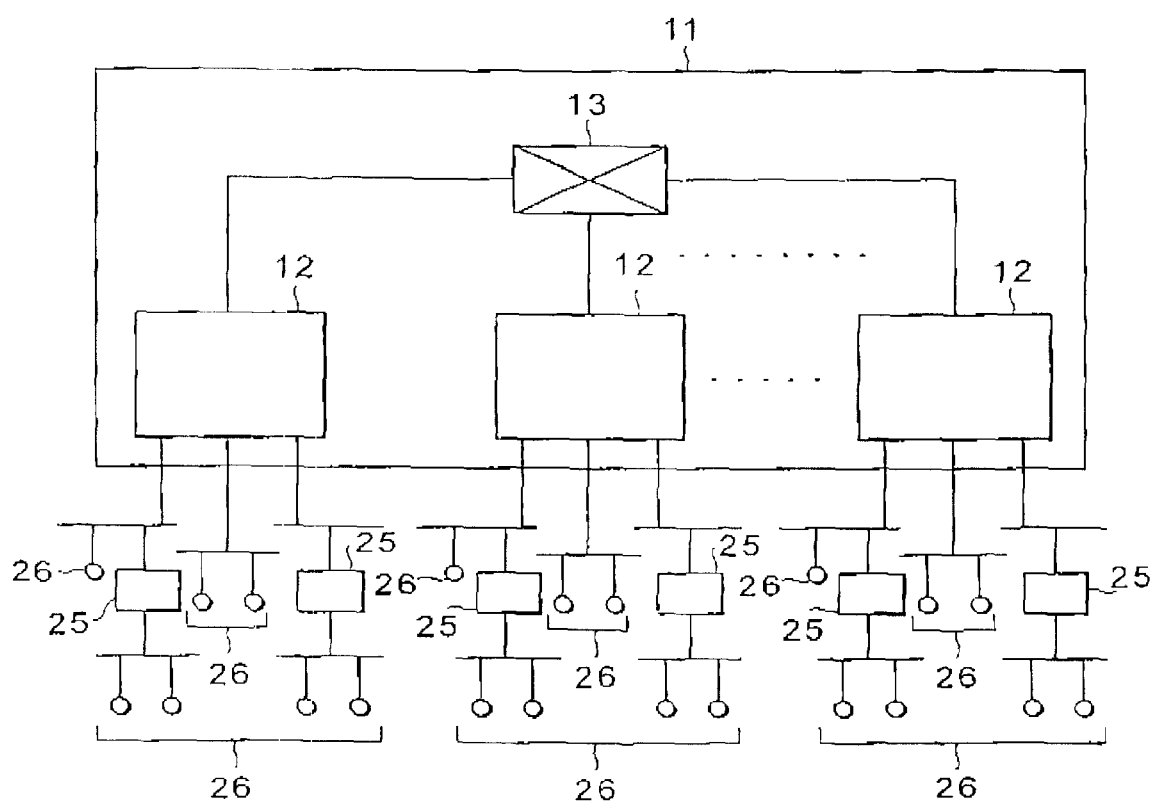
FIG. 1 is a block diagram showing the configuration of a network system in which a cluster-type router according to an embodiment of the present invention is used.

FIG. 1 shows an example of a network in which a cluster-type router according to this embodiment is used.

As shown in the figure, communication terminals 26 and routers 25 are connected to a cluster-type router 11. Each router 25 transfers routing protocol packets to or from the cluster-type router 11 to get network connection information, assuming that the cluster-type router 11 is a single router. Based on the network connection information from the cluster-type router 11, the router 25 generates its own routing table and, based on the table, forwards packets. How the cluster-type router 11 transfers routing packets and how it generates routing tables will be described later in detail. The contents of a routing packet sent from the router 25 to the cluster-type router 11 are the same as those of a routing packet sent to a non-cluster-type router (a router not composed of a plurality of router nodes). Also, the contents of a routing packet sent from the cluster-type router 11 to the router 25 are the same as those of a routing packet received from a non-cluster-type router (a router not composed of a plurality of router nodes). Also, packets are forwarded via the cluster-type router 11 in exactly the same way they are forwarded via a non-cluster-type router.

The routers 25 and the cluster-type router 11 shown in the figure each represent one network.

As shown in the figure, the cluster-type router 11 comprises a plurality of router nodes 12 and a node-to-node switch 13.

Figure 2:
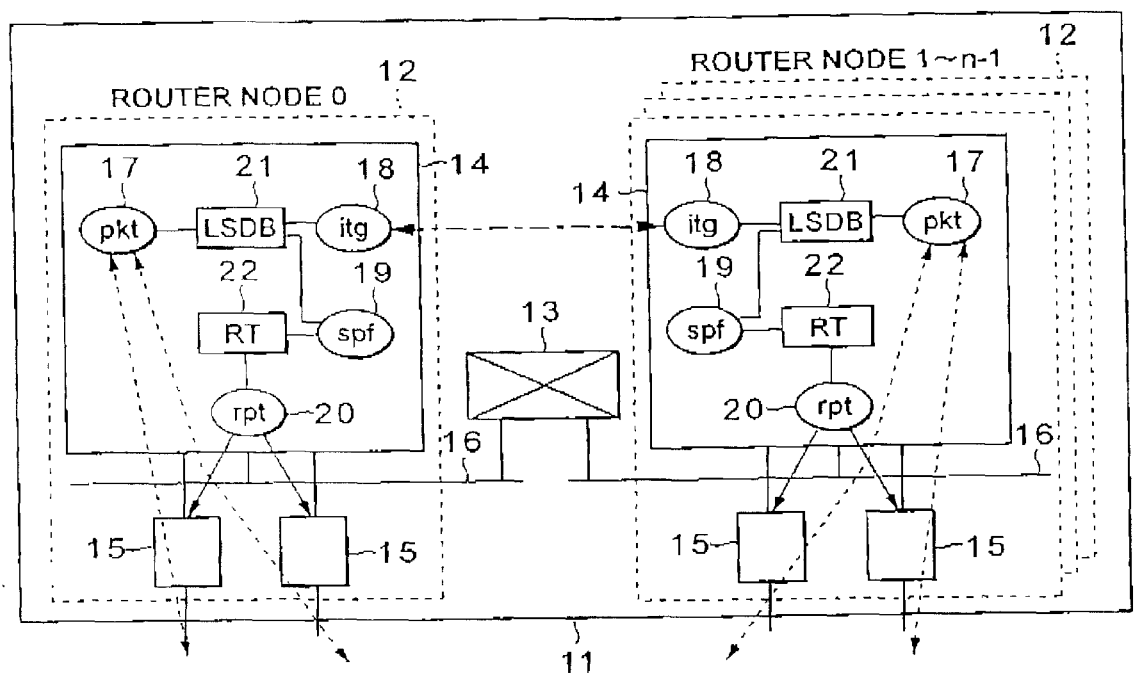
FIG. 2 is a diagram showing the configuration of the cluster-type router according to the embodiment of the present invention.

FIG. 2 shows the configuration of the router node 12.

As shown in the figure, each router node 12 is divided basically into two: one is a path calculation unit 14 which generates and distributes a routing table used for packet forwarding and the other is a forwarding unit 15 which forwards packets. These two are connected via a node internal bus 16.

The path calculation unit 14 in the router node 12, in turn, has a packet sender/receiver 17, a database integrator 18, a routing table calculator 19, a routing table distributor 20, a link state database 21, and a routing table 22.

Figure 3:
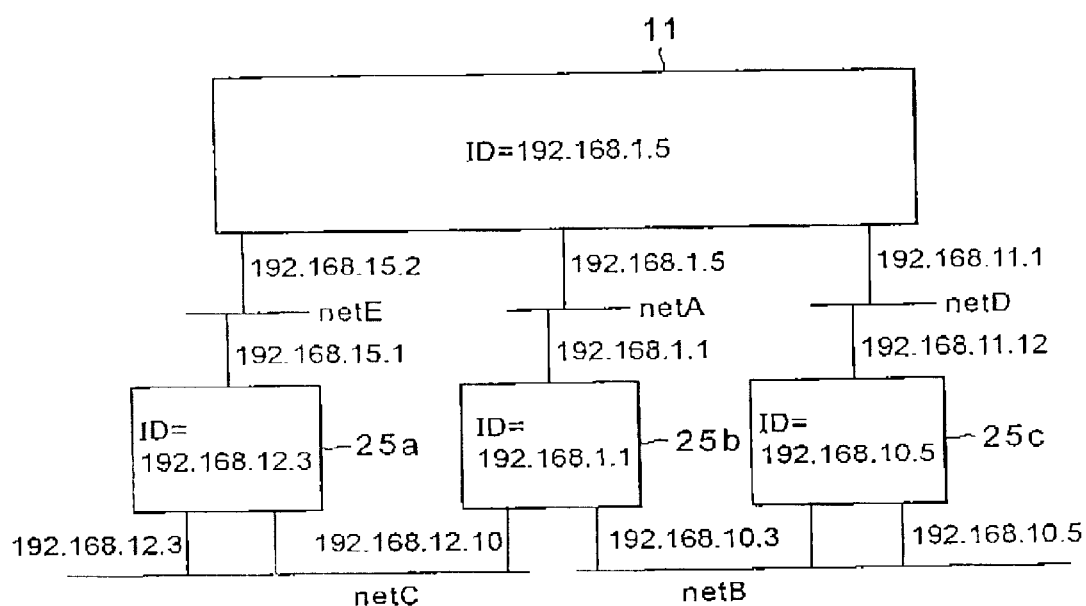
FIG. 3 is a diagram showing an example of network connections of the cluster-type router according to the embodiment of the present invention.

First, the contents of the link state database 21 and the contents of the routing table 22 will be described. Assuming that a network is composed of the cluster-type router 11 and three routers, 25a, 25b, and 25c, as shown in FIG. 3.

It will assumed that the three interfaces of the cluster-type router 11 are connected to netE, netA, and netD, that the two interfaces of router 25a are connected to netE and netC, that the two interfaces of router 25b are connected to netA and netC, and that the two interfaces of router 25c are connected to netD and netB, respectively.

It will also be assumed that the addresses shown in the figure are assigned to the interfaces between each network and, the cluster-type router 11 and routers 25a, 25b, 25c associated interfaces and that each router has the ID (identifier), called a router ID, assigned as shown in the figure.

FIG. 4 shows the contents of the link state database 21 of each router node 12 included in the cluster-type router 11.

As shown in the figure, the database contains, for the cluster-type router 11 and each router 25 connected to the cluster-type router 11, information on the router ID, the networks to which the router indicated by the ID is connected, the addresses of the interfaces with the networks, and the cost of each interface. The cost, which is specified, for example, by the configuration definition of each interface of each router, is determined considering the bandwidth of the network and the user policy. As will be described later, the contents of the link state database 21 contained in all router nodes 12 are identical.

The link state database 21 reflects the configuration of the network shown in FIG. 3. For example, the entry with the router ID of 192.168.1.1 indicates that the router with the ID of 192.168.1.1 is connected to netA, netB, and netC and that the connected interface addresses are 192.168.1.1, 192.168.10.3, and 192.168.12.10. This indicates the connection of router 25b shown in FIG. 3.

Next, FIG. 5 shows the contents of the routing table 22 of each router node 12.

Each router node 12 generates the routing table 22 from the link state database 21 for use in packet forwarding according to a predetermined procedure. This procedure, called a Shortest Path First (SPF) algorithm, determines the shortest path from the router to the destination network considering the cost, and adds that path to the routing table 22.

The routing table 22 generated by each router node 12 in the cluster-type router 11 according to the SPF algorithm contains one or more entries. Each entry contains information on each network, the address of the interface (next-hop router address) through which packets are to be forwarded before reaching the network, and the total cost required for packets to reach the network.

In FIG. 3, the cluster-type router 11 is connected directly (not via other routers) to netA, netD, and netE. This is why netA, netD, and netE have no next-hop router address.

On the other hand, there are two paths from the cluster-type router 11 to netB: a path through netA and the router 25b and a path through netD and the router 25c (see FIG. 3). The total cost of the former path is 4 because the sum of the cost from the cluster-type router 11 to the interface with netA (with a value of 1) and the cost from the router 25b to the interface with netB (with a value of 3) is 4. The total cost of the latter path is 2 because the sum of the cost from the cluster-type router 11 to the interface with netD (with a value of 1) and the cost from the router 25c to the interface with netB (with a value of 1) is 2. In this case, the latter path with the lower cost is selected. Therefore, the next hop router address of netB is 192.168.11.12, which is the address of the interface between the router 25c and netD, with the cost being 2.

Similarly, there are two paths from the cluster-type router 11 to netC: a path through netE and the router 25a and a path through netA and the router 25b (see FIG. 3). The total cost of the former path is 6 because the sum of the cost from the cluster-type router 11 to the interface with netE (with a value of 1) and the cost from the router 25a to the interface with netC (with a value of 5) is 6. The total cost of the latter path is 4 because the sum of the cost from the cluster-type router 11 to the interface with netA (with a value of 1) and the cost from the router 25b to the interface with netC (with a value of 3) is 4. In this case, the latter path with the lower cost is selected. Therefore, the next hop router address of netC is 192.168.1.1, which is the address of the interface between the router 25b and netA, with the cost being 4.

It should be noted that the routers 25 other than cluster-type router 11 each have their own link state database and routing table.

The following describes how the link state database 21 and the routing table 22 of each router node 12 are created.

In FIG. 2, the packet sender/receiver 17 of the router node 12 sends and receives routing protocol packets, containing network connection information, to or from the routers 25, connected not via any of other router nodes 12, in order to get connection information on the routers 25. Then, it stores the obtained network connection information into the link state database 21 in the path calculation unit 14. The network connection information on each router at least contains information equivalent to the information on the router stored in the link state database 21 shown in FIG. 4.

After that, the packet sender/receiver 17 sends update information to the database integrator 18 and the routing table calculator 19 to inform them that the link state database 21 has been updated, and passes the update contents to them.

Upon receiving information from the packet sender/receiver 17 saying that the link state database 21 has been updated, the routing table calculator 19 and the database integrator 18 are started. The routing table calculator 19 calculates, using the link state database 21, the minimum cost required to reach each network as described above, and writes the result into the routing table 22. On the other hand, the database integrator 18 sends the update information to the database integrators 18 of the other router nodes 12 to inform them that the link state database 21 has been updated, and passes the update contents to them.

The database integrator 18 in the receiving router node 12, which receives the update information, reflects the update information on its own link state database 21. In this way, network connection information collected by the packet sender/receivers 17 of each of all router nodes 12 is reflected equally on the link state databases 21 in all router nodes 12.

When the database integrator 18 updates the link state database 21, the routing table calculator 19 is started. The routing table calculator 19 then calculates the minimum cost path from the updated link state database 21 and writes the result into the routing table 22.

When the routing table calculator 19 updates the routing table 22, the routing table distributor 20 is started to inform all forwarding units 15, included in that router node 12, of the update contents of the routing table 22.

Each forwarding unit 15 forwards packets according to the contents of the routing table determined by the received update contents of the routing table 22. That is, the forwarding unit 15 does not forward a received packet whose destination is the network which received the packet. For a packet whose destination is not the network which received the packet, the forwarding unit 15 sends the packet received from some other forwarding unit 15 to the destination network as follows. That is, the forwarding unit 15 sends the packet, via the node internal bus 16 or via the node internal bus 16 and the node-to-node switch 13, to the forwarding unit 15 connected to the network interface to which the network whose network interface is indicated by the next-hop router address stored in the routing table 22.

The following describes, in detail, each component related to the processing described above.

Figure 6:
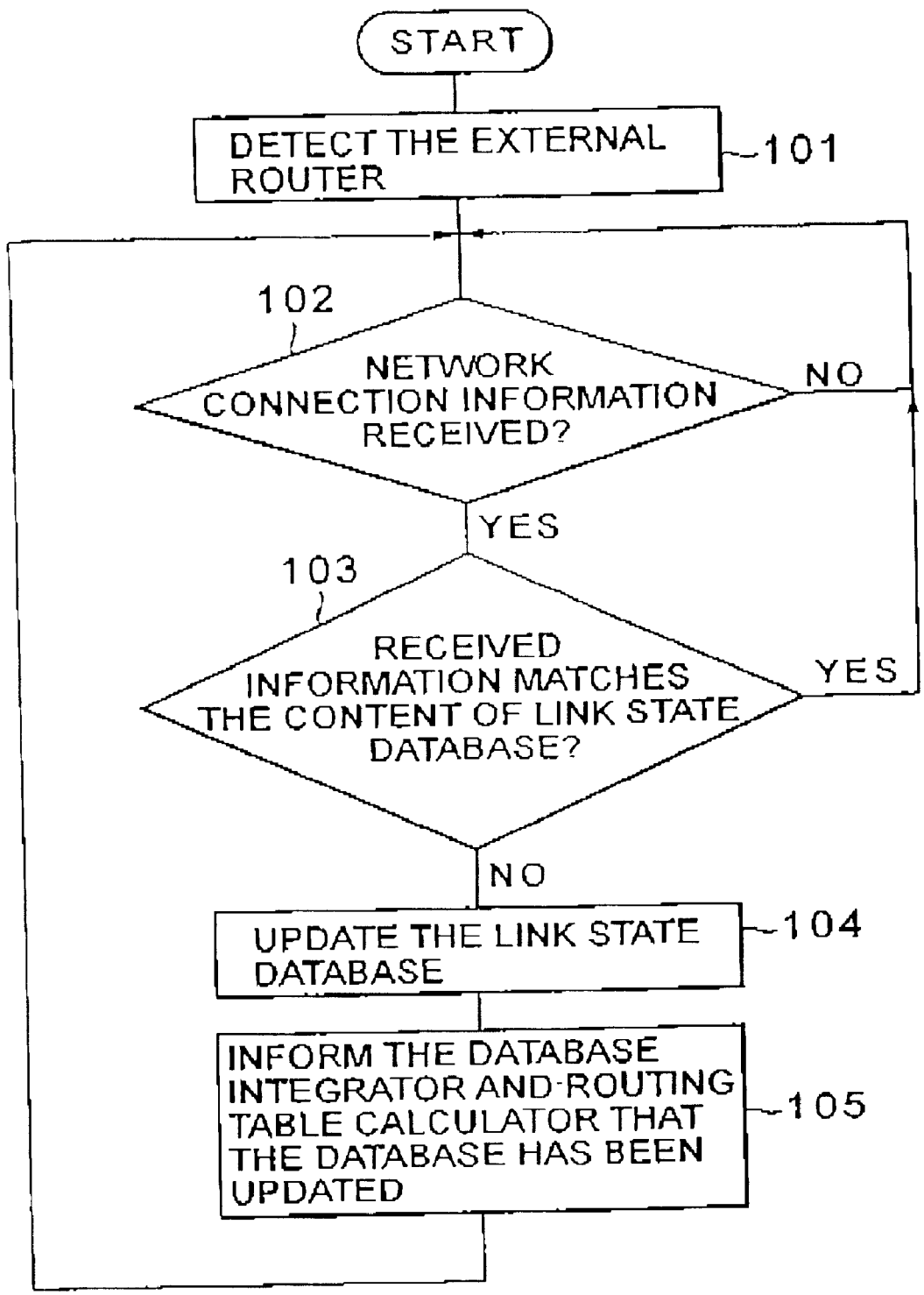
FIG. 6 is a flowchart showing processing performed by a packet sender/receiver in the router node according to the embodiment of the present invention.

FIG. 6 is a flowchart showing the steps performed by the packet sender/receiver 17.

The cluster-type router 11, when started, starts the packet sender/receiver 17. First, the packet sender/receiver 17 detects the router 25 on the network directly connected to the router node 12 (step 101) and checks if network connection information has been received from the router (step 102). If network connection information has been received from the router, the packet sender/receiver 17 checks if the received network connection information matches the contents of the link state database 21 (step 103). If they match, there is no need to update the link state database 21. If they do not match, that is, if the existing information must be updated or deleted or new information must be added, the packet sender/receiver 17 updates the link state database 21 (step 104). Then, the packet sender/receiver 17 sends update information on the link state database 21 to inform the database integrator 18 that the link state database 21 has been updated, passes the update contents to it, sends update information to the routing table calculator 19 saying that the link state database 21 has been updated (step 105), and then returns control to step 102 to check if the next network connection information has been received.

Figure 7:
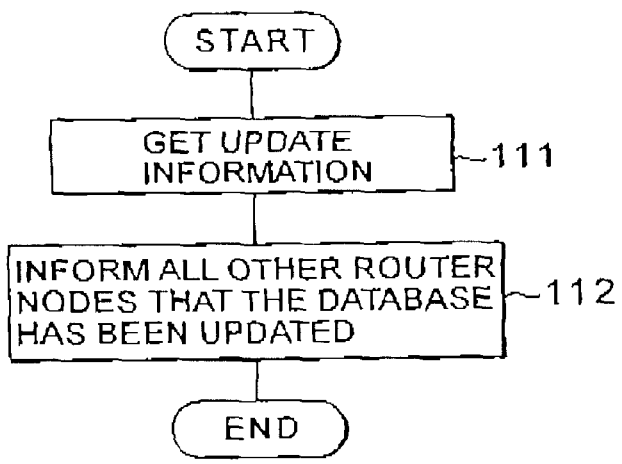
FIG. 7 is a flowchart showing processing performed by a database integrator in the router node according to the embodiment of the present invention.
Figure 8:
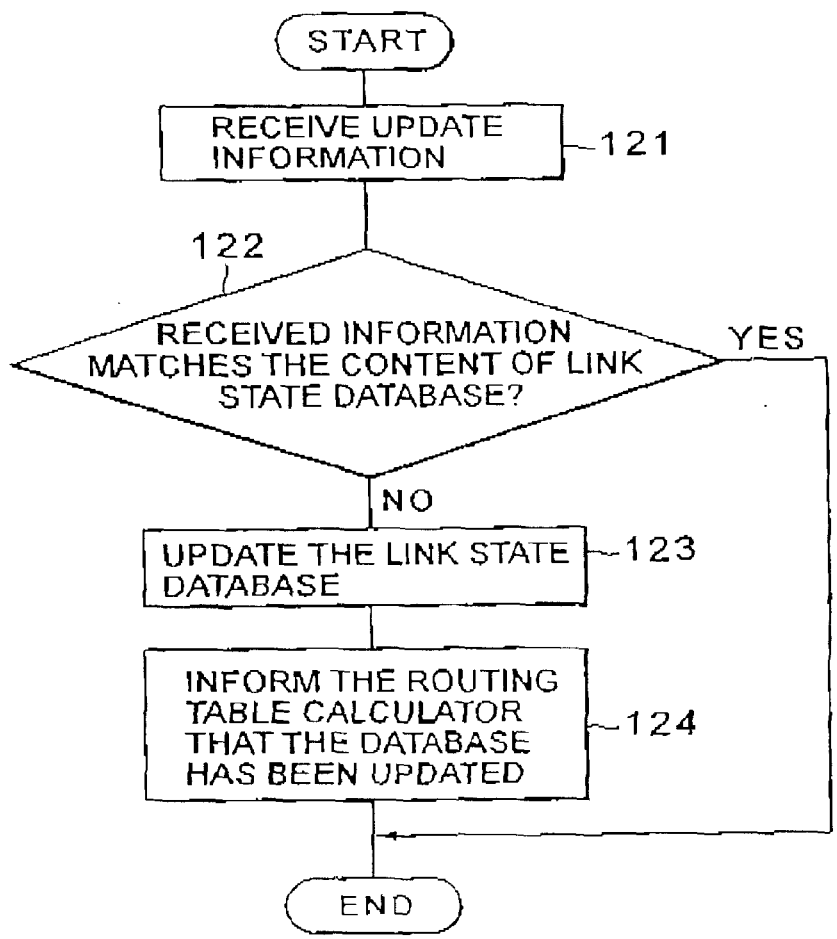
FIG. 8 is a flowchart showing processing performed by a database integrator in the router node according to the embodiment of the present invention.

FIGS. 7 and 8 show the steps performed by the database integrator 18.

Upon receiving the update information on the link state database 21 from the packet sender/receiver 17, the database integrator 18 performs the processing shown in FIG. 7.

As shown in the figure, the database integrator 18 gets the update contents to be applied to the link state database 21 (step 111), sends update information to all router nodes 12 other than the one to which the database integrator 18 belongs in order to inform them that the link state database 21 has been updated, passes the update contents to them (step 112), and ends processing.

FIG. 8 shows the steps performed by the database integrator 18 when it receives update information on the link state database 21 from some other router node 12.

As shown in the figure, the database integrator 18 gets update contents from some other router node 12 (step 121) and checks if the updated contents match the contents of the link state database 21 (step 122). If they match, the database integrator 18 ends processing because there is no need to update the link state database 21. If they do not match, that is, if the existing information must be updated or deleted or new information must be added, the database integrator 18 updates the link state database 21 (step 123). The database integrator 18 then sends update information to the routing table calculator 19 to inform it that the link state database 21 has been updated, passes the update contents to it (step 124), and ends processing.

Figure 9:
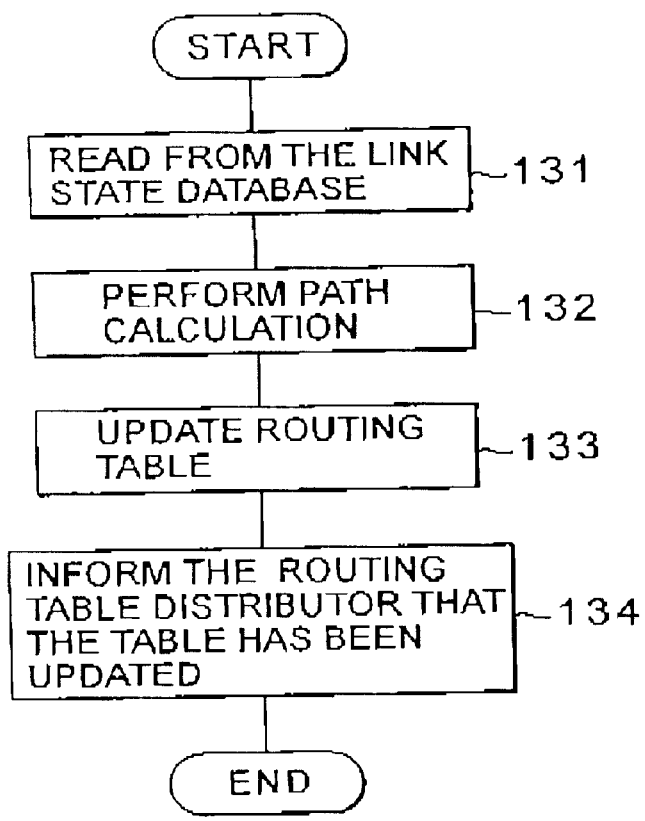
FIG. 9 is a flowchart showing processing performed by a routing table calculator in the router node according to the embodiment of the present invention.

FIG. 9 shows the steps performed by the routing table calculator 19 when it receives update information on the link state database 21.

As shown in the figure, the routing table calculator 19 reads from the link state database 21 (step 131) and performs path calculation according to the SPF algorithm (step 132). The routing table calculator 19 then reflects the calculation result in the routing table 22 (step 133), sends update information to the routing table distributor 20 to inform it that the routing table 22 has been updated, passes the update contents to it (step 134), and ends processing.

Figure 10:
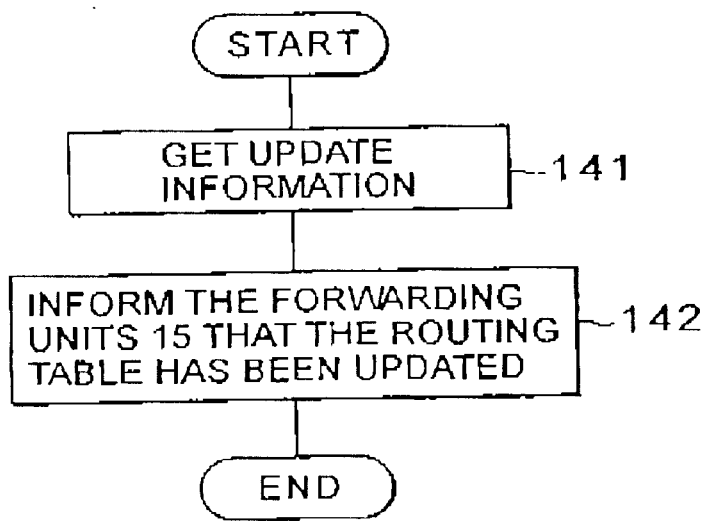
FIG. 10 is a flowchart showing processing performed by a routing table distributor in the router node according to the embodiment of the present invention.

FIG. 10 shows the steps performed by the routing table distributor 20 when it receives information indicating that the routing table 22 has been updated.

As shown in the figure, the routing table distributor 20 gets update information (step 141), sends the update information to all forwarding units 15 in the router node 12 to which it belongs in order to inform them that the routing table 22 has been updated, passes the update contents to them (step 142), and ends processing.

The cluster-type router 11 operates as described above.

Figure 11:
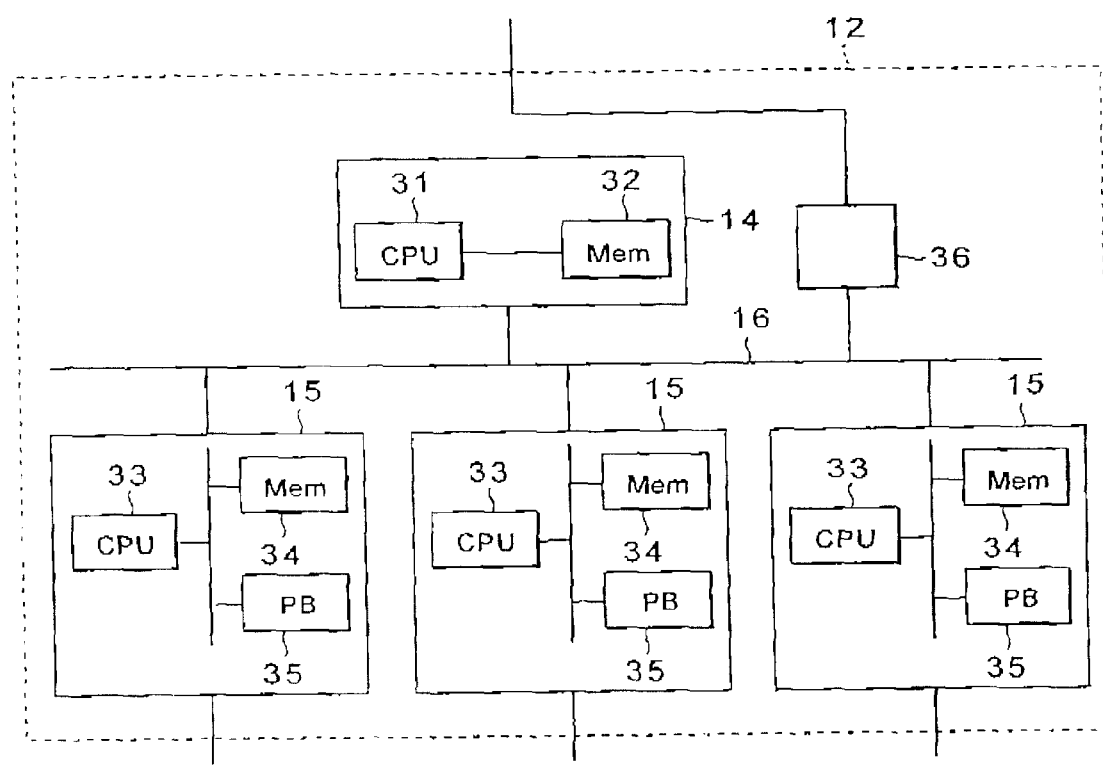
FIG. 11 is a diagram showing an example of the hardware configuration of the cluster-type router according to the present invention.

It should be noted that each router node 12 in the cluster-type router 11 shown in FIG. 2 may be configured by the hardware shown in FIG. 11.

In this configuration, the path calculation unit 14 and the forwarding unit 15 are connected via the node internal bus 16. Also, the router node 12 is connected to some other router node 12 via a switch access controller 36.

The path calculation unit 14 includes a path calculation processor 31 and a memory 32. The path calculation processor 31 sends or receives routing protocol packets to or from the routers 25 connected to the router node 12, creates the link state database, and calculates and distributes the routing table. The packet sender/receiver 17, database integrator 18, routing table calculator 19, and routing table distributor 20 are all implemented as processes executed on the path calculation processor 31. The memory 32 is used to store the link state database 21 and the routing table 22.

On the other hand, forwarding unit 15 includes a forwarding processor 33, a memory 34, and a packet buffer 35. The forwarding processor 33 judges if a packet is to be forwarded or not, determines a destination of the packet and routes packets. The memory 34 contains the routing table, necessary for packet forwarding, created according to the update contents distributed by the path calculation unit 14. The packet buffer 35 temporarily stores packets received by the router node 12. A packet to be forwarded is transferred to the packet buffer in the forwarding unit 15 determined according to the next hop address. A packet not to be forwarded is erased from the packet buffer 35.

One embodiment of the present invention has been described.

According to the present embodiment, each router node in the cluster-type router, configured in such a way that a plurality of router nodes are interconnected to perform at high speed and to function as a single router, sends or receives routing protocol packets only to or from other directly-connected routers to get network connection information.

In addition, network connection information obtained by each router node is sent to all other router nodes as necessary. Therefore, each router node may get network connection information obtained by other router nodes and integrate it with network connection information the router node itself has obtained. This makes it possible for all router nodes to share network connection information from all routers connected to the cluster-type router.

Compared with the method in which network connection information is shared by transferring routing protocol packets among router nodes, fewer network addresses are used. In addition, compared with the method in which only one router node performs routing protocol processing, a more expandable cluster-type router, which accepts more network interfaces and eliminates the processing bottleneck, may be implemented.

As mentioned above, the router device according to the present invention, which is composed of a plurality of router nodes, can perform routing protocol processing with fewer addresses and with no additional load on a particular router node.

What is claimed is:

1. A router device comprising a plurality of router node devices connected to networks respectively, wherein said plurality of router node devices are interconnected via internal transmission lines that are different from said networks, and each of said plurality of router node devices within said router device has a same ID allocated in said networks, each of said plurality of router node devices comprising:

means for connecting to said networks;

a routing table describing paths via which packets are forwarded;

forwarding means for forwarding packets between one network and another network, both of which networks are connected to the router node device, and for forwarding packets between the network connected to the router node device and the network connected to some other router node device of the router device via said some other router node device, said packet forwarding being performed according to the routing table;

network information collection means for collecting network information by routing protocols from some other router device connected to the network, not via other router node devices, said network information being of a network to which said other router device is connected;

generating means for generating a network connection information database using the information of said network thus collected;

sending means for sending, via said transmission lines, said network connection information database to some other router node device that is provided with the same ID;

receiving means for receiving from said some other router node device having the same ID, via said internal transmission lines, said network connection information database generated by said some other router node device having the same ID;

integrating means for integrating said network connection information database generated by one router node device and different network connection information database received from some other router node device; and routing table generation means for generating the routing table based on the network connection information database thus integrated.

2. A network system comprising the router device according to claim 1 and a plurality of networks connected to the router device.

3. A router device comprising a plurality of router node devices interconnected via internal transmission lines, wherein:

each router node device has a plurality of forwarding units, each connected to a network, and a path calculation unit, each of said plurality of forwarding units comprising:
a routing table describing paths via which packets are forwarded; and
forwarding means for forwarding, according to the routing table, packets between the network connected to the forwarding unit and the network connected either to some other forwarding unit of the same router node device or to some other forwarding unit of some other router node device via the some other forwarding unit; and said path calculation unit comprising:
network information collection means for collecting network information from the other router devices connected to the network connected to each forwarding unit of the router node device, said network information being information to be exchanged among the router devices in order to create the routing table in each router device;
information means for informing the other router node devices of the collected network information via said internal transmission lines;
integration means for integrating the collected network information with the network information sent from the other router node devices;
routing table generation means for generating the routing table based on the integrated network information; and
distribution means for distributing the generated routing table to the forwarding units of the router node device.

4. The router device according to claim 3, wherein
said path calculation unit has a link state data base (LSDB);
said network information collection means exchanges routing protocol packets with other router devices connected to each network connected to each forwarding unit of the router node device in order to collect network connection information on the other router devices for use as the network information on the other router devices and stores the collected network information into the link state database, said routing protocol packets conforming to OSPF (Open Shortest Path First) stipulated by RFC (Request for Comments) issued by the IAB (Internet Architecture Board);
said information means informs the other router node devices of link state database contents;
said integration means integrates the link state database contents sent from the other router node devices into said link state database; and
said routing table generation means also generates the routing table based on the integrated link state database.

5. A plurality of router node devices used to construct a router device wherein, said plurality of router node devices are interconnected via internal transmission lines that are different from said networks, and each of said plurality of router node devices within said router device has a same ID, which is allocated in said networks, each of said plurality of router node devices comprising:

means for connecting to said networks;
a routing table for describing paths via which packets are forwarded;
forwarding means for forwarding packets between one network and another network, both networks being connected to the router node device, and for forwarding packets between the network connected to the router node device and the network connected to some other router node device of the router device via said some other router node, said packet forwarding being performed according to the routing table;
network information collection means for collecting network information by routing protocols from some other router device connected to the network connected, not via other router node devices, said network information being of a network to which said other router device is connected
generating means for generating a network connection information database using the information of said network thus collected;
sending means for sending, via said internal transmission lines, said network connection information database to some other router node device that is provided with the same ID;
receiving means for receiving from said other router node device having the same ID, via said internal transmission lines, said network connection information database generated by said other router node device having the same ID;
integrating means for integrating said network connection information database generated by one router node device and different network connection information database received from some other router node device; and
routing table generation means for generating the routing table based on the network connection information database thus integrated.

6. A method for processing a routing protocol for generating a routing table, for use in a router device comprising a plurality of router node devices connected to networks and interconnected via internal transmission lines, comprises the steps of:

causing each of said router node devices to collect network information by routing protocols from other router devices connected to the network, not via other router nodes, to the router node device, said network information being of a network to which the other router devices are connected;
generating a network connection information database using the network information collected;
sending and receiving, via said internal transmission lines, said network connection information database to and from other router node devices that are provided with the same ID;
integrating said network connection information database generated by one router node device and network connection information database received from other router node devices; and
generating the routing table based on the network connection information database thus integrated.

7. A method for processing a routing protocol for generating a routing table, for use in a router device comprising a plurality of router node devices connected to networks and interconnected via internal transmission lines, said method comprising the steps of:

causing each of said plurality of router node devices to collect network information from other router devices connected to the network, not via other router nodes, to the router node in order to create the routing table in the router device, said network information being information to be exchanged among router devices;

distributing collected network information among said plurality of router nodes via said internal transmission lines; and causing each of said plurality of router node devices to create the routing table based on the collected network information and the network information distributed by other router node devices.

8. A router device comprising a plurality of router nodes connected to respective networks, and interconnected via internal transmission lines different from said networks, each of said router nodes forming the router device comprising:

means for connecting to said networks;

a routing table for describing paths via which packets are forwarded;

forwarding means for forwarding packets, in accordance with the routing table, between one network and another network connected to the router node, and for forwarding packets, in accordance with the routing table, between the network connected to the router node and the network connected to another router node within the router device via said another router node;

network information collection means for collecting network information by routing protocols from another router device connected to the network, not via other router nodes, said network information being of a network to which said another router device is connected;

generating means for generating a network connection information database using the information of said network thus collected;

sending means for sending, via said internal transmission lines, without using said routing protocols, said network connection information database to other router nodes that are provided with the same ID;

receiving means for receiving from other router nodes having the same ID, via said internal transmission lines, without using said routing protocols, said network connection information database generated by said other router nodes having the same ID;

integrating means for integrating said network connection information database generated by one router node and network connection information database received from other router nodes; and routing table generation means for generating the routing table based on the network connection information database thus integrated.

9. A router device according to claim 8, wherein:

each of said router nodes is provided with a forwarding unit; and each of said router nodes has distribution means for distributing the routing table thus generated to the forwarding unit provided therein.

10. A router device according to claim 9, wherein:

said network information collection means exchanges routing protocol packets with other router devices connected to the network connected to the forwarding unit of the router node in order to collect network connection information on the other router devices for use as the network information on the other router devices and store the collected network information into said network connection information database, said routing protocol packets conforming to OSPF (Open Shortest Path First) stipulated by RFC (Request for Comments) issued by the IAB (Internet Architecture Board);

said sending means informs the other router nodes of updated contents of said network connection information database, when said network connection information database is updated;

said integration means updates the network connection information database using the updated contents of said network connection information database received from the other router nodes; and said routing table generation means generates the routing table based on said network connection information database thus updated.

11. An arrangement, comprising:

a plurality of routers each having a unique ID; and a cluster-type router connected to the routers, via different networks, including a plurality of router nodes interconnected to serve as a single router with a single unique ID and to perform routing functions using the same unique ID, each of said router nodes within the cluster-type router comprising:

a packet sender/receiver arranged to send and receive routing protocol packets which contains network connection information to/from the routers, via different networks;

a link state database arranged to store the network connection information;

a database integrator arranged to integrate any update network connection information from other router nodes within the cluster-type router in the link state database;

a routing table calculator arranged to calculate a minimum cost required to reach different networks using the link state database, and to store results in a routing table for subsequent distribution to all other router nodes within the cluster-type router for updates.

12. An arrangement according to claim 11, wherein each of the router nodes within the cluster-type router is further provided with a forwarding unit to forward data packets according to contents of the routing table, and a routing table distributor to distribute the results in the routing table to all other router nodes within the cluster-type router for updates, via the forwarding unit.

13. An arrangement according to claim 12, wherein the routing table calculator is further configured to read from the link state database, perform path calculations, update the routing table, and inform the routing table distributor that the routing table has been updated.

14. An arrangement according to claim 12, wherein the routing table distributor is further configured to receive the update on the routing table, and to inform the forwarding unit that the routing table has been updated.

15. An arrangement according to claim 12, wherein the packet sender/receiver, the database integrator, the routing table calculator and the routing table distributor are implemented as processes executed by a processor.

16. An arrangement according to claim 11, wherein all router nodes within the cluster-type router share the same unique ID, and a selected group of router nodes is connected to different routers, via a different network.

17. An arrangement according to claim 11, wherein contents of the link state database in each router node within the cluster-type router are identical, and include information pertaining to different router ID, networks, interface addresses and cost factors that are based on the bandwidth of the network and a user policy.

18. An arrangement according to claim 11, wherein the packet sender/receiver is further configured to update the link state database and inform the data integrator and the routing table calculator that the database has been updated.

19. An arrangement according to claim 11, wherein the database integrator is further configured to receive the update on the link state database from the packet sender/receiver and inform all other router nodes within the cluster-type router that the database has been updated.

20. An arrangement according to claim 11, wherein the database integrator is further configured to receive the update on the link state database from another router node within the cluster-type router, update the link state database accordingly, and to inform the routing table calculator that the database has been updated.

* * * * *